Dec. 23, 1924.

E. W. COMFORT 1,520,533

HYGROMETRIC INDICATOR, RECORDER, AND REGULATOR

Filed Jan. 14, 1921　　3 Sheets-Sheet 1

Inventor.
Edward W. Comfort
by Heard Smith & Tennant.
Attys.

Dec. 23, 1924.
E. W. COMFORT
1,520,533
HYGROMETRIC INDICATOR, RECORDER, AND REGULATOR
Filed Jan. 14, 1921   3 Sheets-Sheet 3
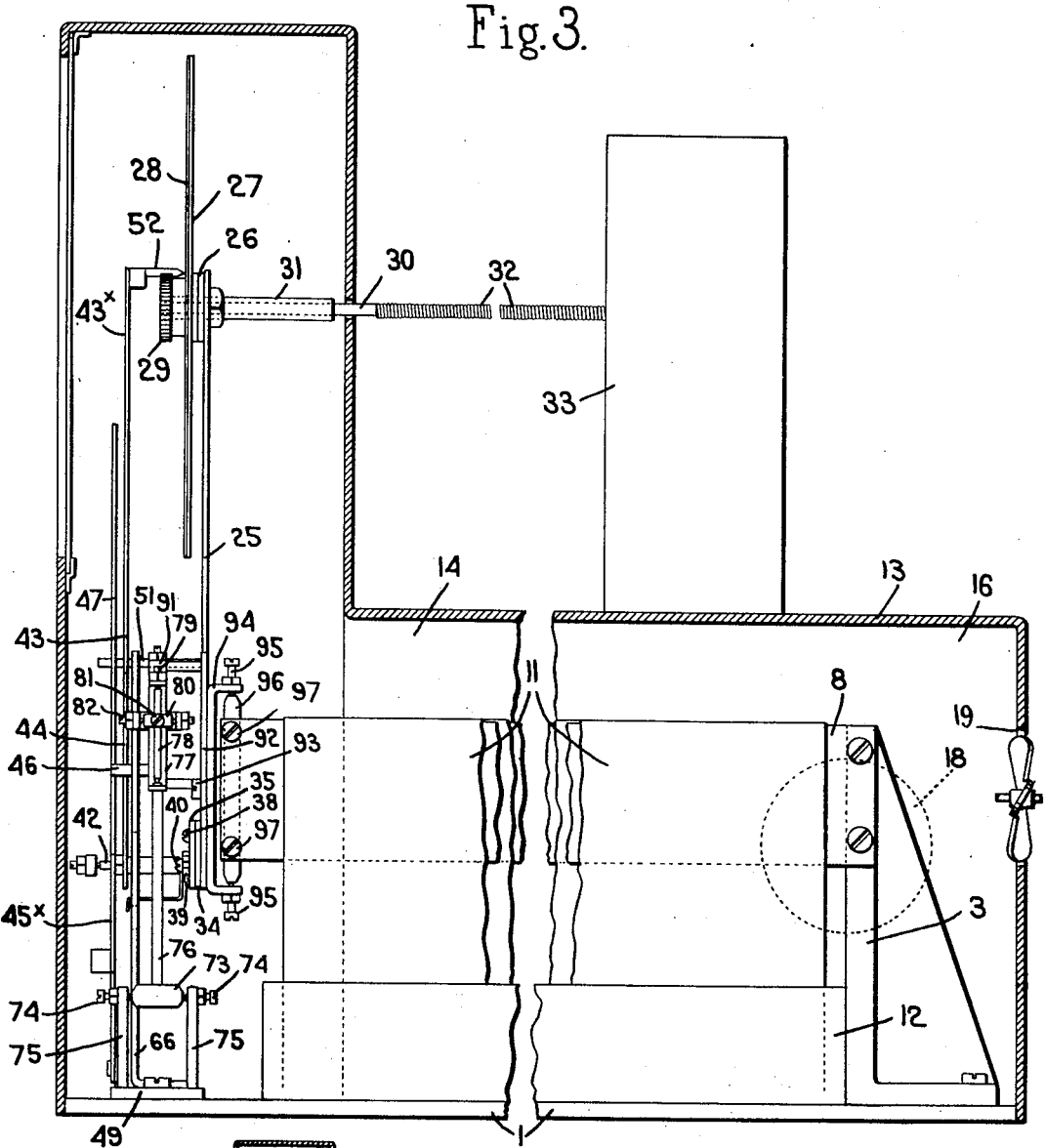
Inventor.
Edward W. Comfort
by Heard Smith & Tennant.
Attys.

Patented Dec. 23, 1924.

1,520,533

UNITED STATES PATENT OFFICE.

EDWARD W. COMFORT, OF WINCHESTER, MASSACHUSETTS, ASSIGNOR TO PARKS-CRAMER COMPANY, OF BOSTON, MASSACHUSETTS, A CORPORATION OF MASSACHUSETTS.

HYGROMETRIC INDICATOR, RECORDER, AND REGULATOR.

Application filed January 14, 1921. Serial No. 437,236.

*To all whom it may concern:*

Be it known that I, EDWARD W. COMFORT, a citizen of the United States, and resident of Winchester, county of Middlesex, State of Massachusetts, have invented an Improvement in Hygrometric Indicators, Recorders, and Regulators, of which the following description, in connection with the accompanying drawing, is a specification, like characters on the drawing representing like parts.

This invention relates to improvements in hygrometric apparatus and the object thereof is to provide an improved instrument comprising controllers movable manually or automatically independently to positions indicative of wet and dry bulb temperatures, the movements of said controllers being so correlated as to actuate an indicating mechanism which will indicate or register directly a condition of humidity dependent upon the relation of the wet bulb temperature to the dry bulb temperature, such for example as relative humidity, regain of cotton, etc.

It is a well known fact that various conditions or properties of the atmosphere are functions of the relation of the wet bulb temperature to the dry bulb temperature which substantially follow invariable laws, for example, the condition or property of the atmosphere known as relative humidity is a function of the wet and dry bulb temperatures which is empirically expressed by the well known formula:

$$\frac{Tw-4}{Td-4} = Ch$$

in which, $Tw$ is the psychrometric wet bulb temperature in degrees Fahrenheit.

$Td$ is the dry bulb temperature in degrees Fahrenheit.

$Ch$ is a constant for any given relative humidity.

In view of the fact that the aforesaid relation between the wet bulb temperature and the dry bulb temperature is a constant through usual ranges of temperatures, the relative humidity for different temperatures when plotted upon a chart with the wet bulb temperatures as ordinates and the dry bulb temperatures as abscissæ, will be in a straight line which passes through a point approximately four degrees above and substantially at equal distances from the zero point of the axes of ordinates and abscissæ.

The present invention contemplates the production of an instrument having controllers operable automatically by the action of thermo-expansive motors, subject respectively to the wet and dry bulb temperatures of the atmosphere, said controllers to move in lines parallel respectively with the axis of ordinates and the axis of abscissæ at predetermined distances from said axes, the lines of movement of said controllers intersecting preferably at a point four degrees above zero.

The invention further contemplates the provision of means operable by the conjoint movement of said controllers to indicate directly upon a scale a condition of the atmosphere, such as relative humidity. An instrument of this character is, therefore, a computing machine having controllers movable in accordance with certain laws and operating to cause an indicating or recording device to be actuated according to a law dependent upon the movement of said controllers.

A further object of the invention is to provide either recording or regulating means, or both, which are operable by the movement of said controllers.

A further object of the invention is to provide a hygrometric device of this character of simple construction which will be accurate and reliable in operation, the operating parts preferably being constructed wholly of metal of a character which will not be subject to deterioration by use.

Other objects and features of the invention will more fully appear from the following description and the accompanying drawings and will be pointed out in the annexed claims.

In the drawings:

Fig. 3 is a view showing an instrument, embodying my invention, in side elevation, as located within a casing which is shown in section, the central portion of the casing and parts of the construction being broken away to reduce the length of the illustration;

Fig. 4 is a horizontal, sectional view through a casing illustrating diagrammatically in plan the relative positions of the wet and dry bulb thermo-expansive motors and the direction in which the current of air is passed through the apparatus;

Fig. 5 is a detail view illustrating a means by which the apparatus may be caused to record the condition of the air upon the distant recording device; and, Fig. 6 is a detail view illustrating a modified form of apparatus operable to regulate the condition of the atmosphere in accordance with the law differing from that which governs the operation of the instrument illustrated in Fig. 1.

Figure 1:
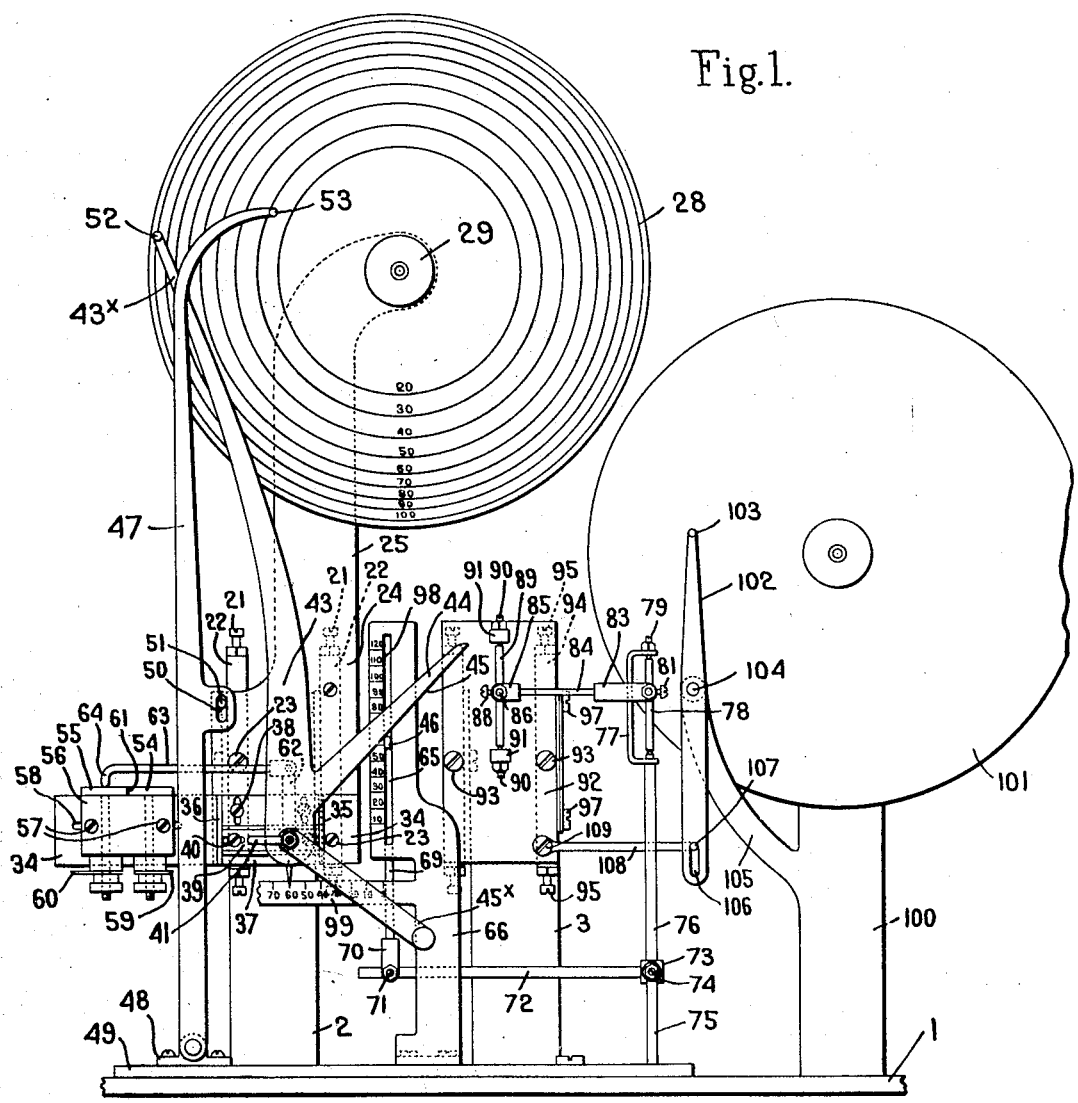
Fig. 1 is a front elevation of a hygrometric apparatus comprising a preferred embodiment of my invention.
Figure 2:
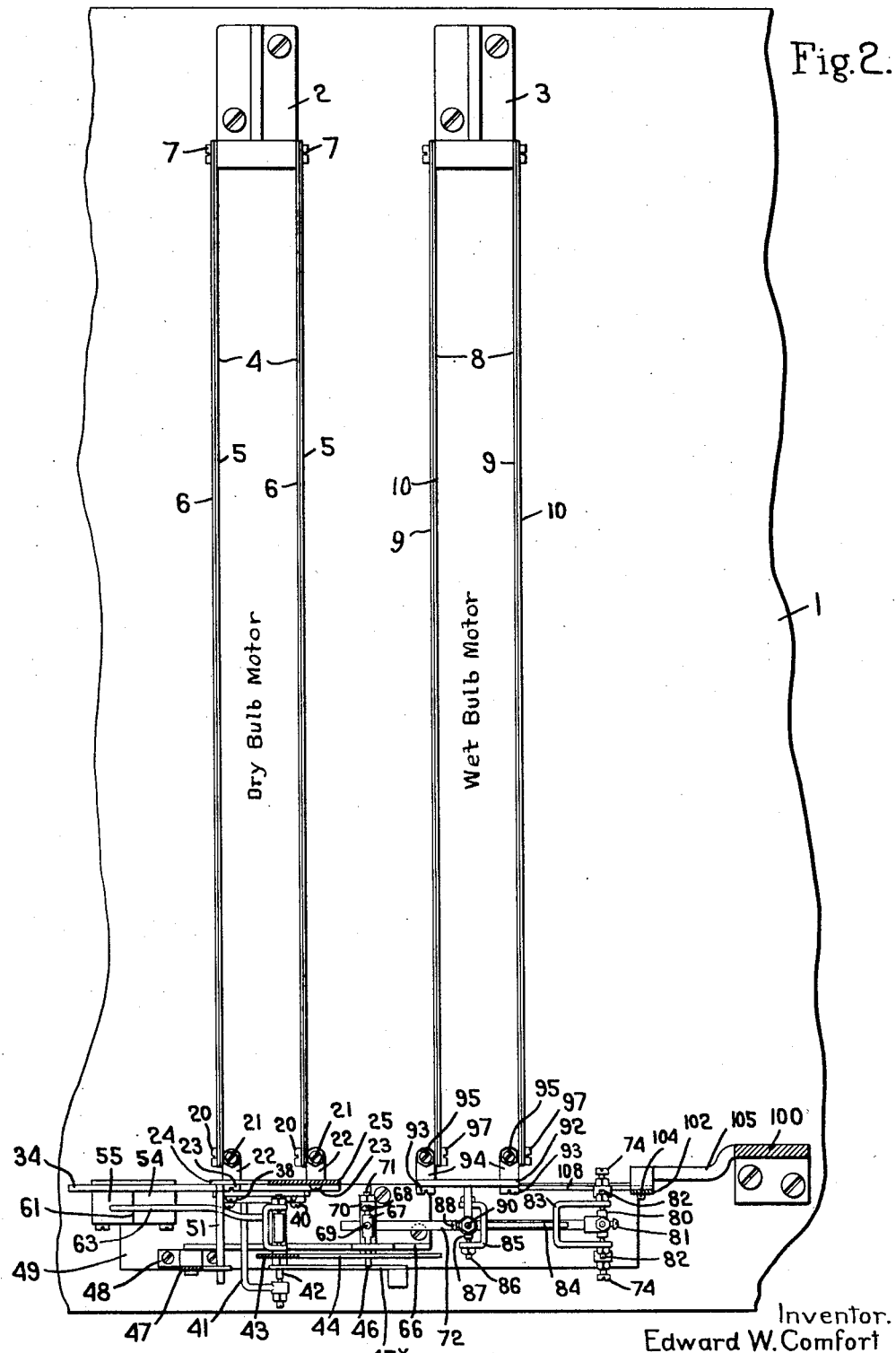
Fig. 2 is a plan view of the same, the recording mechanism being removed and the supporting means therefor shown in section.

The present invention comprises the production of an instrument having movable elements or controllers which may be moved manually, but preferably are moved automatically, in lines disposed at an angle to each other, corresponding to or parallel with the axes of ordinates and abscissæ, mechanism being provided for translating the relative movements of said controllers into a movement of an indicator or recorder relative to a chart so constructed that relative humidity and other functions of the wet and dry bulb temperatures of the atmosphere may be indicated or recorded directly on the chart. The relative movements of the controllers may and are also adapted to control a regulating mechanism for maintaining a predetermined condition of humidity of the atmosphere of an enclosure, having means for supplying moisture or heat, or both, thereto.

The actuation of such controllers may be performed in various ways. A preferred means is illustrated in the accompanying drawings in which the controllers are actuated respectively by thermo-expansive members in the form of bi-metallic bars, subject respectively to the action of the wet and dry bulb temperatures of the atmosphere.

The apparatus illustrated in the accompanying drawings comprises a base 1, which may be provided with levelling means (not shown), and which supports the various parts of the apparatus. Standards 2 and 3, extending upwardly from the rear portion of the base, support the wet and dry bulb thermo-expansive motors. As illustrated herein the dry bulb thermo-expansive motor 4 comprises two bi-metallic flat plates or bars preferably composed of sheets of brass 5 welded to similar sheets 6 of invar metal, the thermo-expansive members 4 being rigidly secured to the standards 2, by screws 7 or other suitable fastenings. The opposite end of the thermo-expansive member is free and is capable of lateral movement when the thermo-expansive members 4 are subjected to variations in temperature. The wet bulb thermo-expansive motor 8 comprises a similar pair of thermo-expansive plates also formed of sheets of brass 9 welded to sheets of invar metal 10, rigidly secured at the rear ends to the standard 3 by screws, or other suitable fastening. The opposite end of the wet bulb thermo-expansive motor, like that of the dry bulb thermo-expansive motor, is free to move laterally when subjected to variations in temperature. The wet bulb thermo-expansive motors may be subjected to the psychrometric wet bulb temperature of the atmosphere in any desired manner. As illustrated herein a mantle 11 passes over the plate 9 and at its lower end dips into water contained in a suitable tank 12 resting upon the base 1.

The entire instrument desirably is enclosed within a casing 13 provided with a central partition 14 dividing the rear portion of the casing into two compartments 15 and 16. The casing is provided with suitable apertures adapted to admit air first into the dry bulb compartment 15 and to permit the same air to escape from the compartment 16 containing the wet bulb expansive motor.

As illustrated, the vertical wall of the chamber 15 is provided with an aperture 18, near the rear end, through which the air enters the casing and, after passing longitudinally through the chamber 15, enters the front end of the wet bulb chamber 16 and escapes therefrom through a suitable aperture 19 in the rear end wall of the casing. The air may be caused to circulate in this manner by any suitable means, such as a suction fan located at the outlet aperture 19.

The plates which form the thermo-expansive motors of the wet and dry bulb thermo-expansive motors desirably are reversely arranged so that when said thermo-expansive motors are subjected to similar variations in temperatures the free ends of said thermo-expansive motors will move in opposite directions.

The plates of the dry bulb thermo-expansive motors are secured at their free ends by screws 20 to vertical spindles having pivotal screws 21 connecting the same to brackets 22 which are pivotally connected intermediate of their ends by screws 23 to a plate 24 which desirably is provided with an upward extension 25 having at its upper end a boss 26 which provides a bearing for a rotatable disk 27 upon the face of which a suitable graduated recording disk 28 may be clamped by a nut 29. The disk 27 is secured to a shaft 30 extending through a suitable journal 31 carried by the extension 25 of the plate 24. The shaft 30 may be rotated through a flexible driving connection 32 from a suitable motor 33, such as a clock, located upon the upper portion of the casing 13.

The plate 24, in the construction illustrated herein, carries one of the controller elements which moves under varying temperature conditions effecting the thermostatic motor in parallelism with the axis of abscissæ indicating the dry bulb temperature of the atmosphere and means are provided by which the controller may be positioned accurately in respect to the axis of ordinates.

In the construction illustrated the plate 24 has secured to its front face a guiding member 34 provided with ways 35 and 36 which engage the ends of a vertically adjustable plate 37 having vertical slots through which clamping screws 38 extend into the plate 34. The plate 37 likewise is provided with horizontal guide ways in which a transversely adjustable plate 39 is seated, the plate 39 being held in laterally adjusted position by screws 40 extending into the vertically adjustable plate 37.

A bracket 41, which is mounted upon the horizontally movable plate 39, supports the outer end of a spindle 42, the opposite end of which is journalled in the plate 39. The spindle 42 performs the function of a controller which is movable by the dry bulb thermo-expansive motor in the direction of the axis of ordinates indicative of the dry bulb temperature of the atmosphere.

In the present construction a transformer 43 is rigidly secured to the controller spindle 42 and desirably is provided with a pointer member 43× which extends upwardly into co-operative relation with the scale 28 which is carried by the rotatable disk 27 on the upper end of the extension 25 of the plate 24. The transformer 43 is provided with means having a suitably designed variable connection, preferably a sliding engagement of a properly computed line or surface, with a controller 46 which is moved by the wet bulb motor in the direction of the axis of abscissæ indicative of the wet bulb temperature of the atmosphere in a manner which will hereinafter be more fully described. The transformer 43 also desirably is provided with a counterweighted arm 45× which will maintain the edge 45 in engagement with the co-operating controller 46.

By thus imparting to the transformer a movement which is the resultant of the bodily movement imparted to it by one of the thermostatic motors, and by providing a properly computed variable connection to the other thermostatic motor, the transformer may be caused to move in accordance with a fixed law dependent upon the relation of the wet bulb temperature to the dry bulb temperature, and the pointer, which is carried by or actuated by the transformer, may be caused to compute and indicate directly upon a suitably graduated scale a condition of humidity of the atmosphere which is dependent upon the relation of the wet bulb temperature to the dry bulb temperature.

Vertical and lateral adjustments are provided for the controllers 42 and 46 which enable them to be set in such a manner as to correspond respectively to positions above and at predetermined distances, preferably equal distances, from the axis of abscissæ and the axis of ordinates, so that indications may be made by the pointer upon suitable scales which may be computations of relative humidity, or other conditions of moisture of the atmosphere which are dependent upon the relation of the wet bulb temperatures to the dry bulb temperatures.

If desired the dry bulb temperature may also be indicated upon a different scale carried by the same disk. This is accomplished by providing another pointer 47 pivotally mounted upon a stud or spindle in a bracket 48 secured to the base 1 or a plate 49 which is anchored to it, the arm 47 being provided intermediate of its ends with a slot 50 for a pin 51 which projects from the plate 24. By reason of this construction the lateral movement of the plate 24, caused by the action of the dry bulb thermo-expansive motor, oscillates the pointer 47 about its pivot in such a manner as to indicate the dry bulb temperature directly upon any suitable scale. The arms 43× and 47 desirably are provided with pen attachments 52 and 53 adapted to record upon the scale continuously the condition of humidity and the dry bulb temperatures. By using different types of ink for the scales and for the pens the records can be readily distinguished.

It is desirable also that the instrument be so constructed as to act as a controller for relative humidity. This is accomplished in the present construction by extending the plate 34, which is attached to and carried by the plate 24, and securing to it a regulating device which may be connected with a suitable relay adapted to turn on and off the supply of moisture, or to control the amount of heat delivered to the enclosure which is to be kept at a predetermined condition of humidity.

As illustrated the regulating device comprises a pair of electrical terminals 54 and 55 carried by an insulated stand 56 which is adjustably secured by bolts 57 extending through slots 58 in the plate 34. The terminals may be connected by conductors 59 and 60 to motors adapted to turn on and off the moisture supplying means or the heat supplying means. The terminals 54 and 55 are separated by insulation 61 so that either may be thrown into the electric circuit independently of the other.

The controller spindle 42 is provided with an upwardly extending arm 62 which is pivotally connected to a contact member 63, the free end 64 of which slidably rests upon the upper faces of the terminals 54 and 55. The instrument itself may be connected directly to the source of electric supply which actuates the relay for controlling the supply of moisture or the supply of heat, or the instrument may be grounded to provide a part of the return circuit for such current. In either case the current will flow through one of the terminals 54 or 55 and thence through the contacting end 64 of the contact member 63, through the instrument to the source of electricity. In the operation of the device the arm 64 may be so positioned as normally to rest upon the terminal 54 which completes an electric circuit adapted to operate a relay to supply moisture to the atmosphere of the enclosure. As the moisture condition of the atmosphere increases the pointer will be swung away from the center of the scale. Such movement of the pointer at the same time moves the contact member 63 toward the terminal 55 until the end 64 of the contact member 63 passes across the insulation 61, interrupting the current which actuates the relay to supply moisture, and energizing the relay which is connected with the terminal 55 to turn off the supply of moisture. The position of the parts illustrated in Fig. 1 shows the pointer 43$^x$ as indicating one hundred percent, (100%), humidity, the wet and dry bulb temperatures being equal.

In order to adjust the instrument in such a manner that a predetermined condition of humidity will be maintained, the pointer may be set by hand in such a manner that it will indicate upon the scale the desired degree of humidity. The regulator member may then be adjusted to cause the insulating member 61 to be positioned directly beneath the end 64 of the contact member 63. Obviously, therefore, when the humidity exceeds a predetermined amount the end 64 of the contact member 63 will be caused to pass from the terminal which controls the relay supplying moisture to the terminal which causes the supply of moisture to be shut off. When the humidity of the enclosure decreases beyond a predetermined amount the reverse action will take place and the action of the moisture supplying mechanism will be resumed.

Any suitable means may be provided to cause the movement of the wet bulb thermo-expansive motor to move the controller 46 to positions corresponding to the axis of ordinates of the wet bulb temperatures, the direction of movement of the controller 46 being necessarily at an angle to the direction of movement of the dry bulb controller 42.

In the present construction the controller 46 is actuated to move in a direction normal to the direction of movement of the dry bulb controller, but it will be understood that other relations may be established by suitable mechanisms to produce the same or other desired results.

As illustrated herein the controller 46 is guided in a slot 65 in a stand 66 rising from the base 1 or secured to the plate 49. The controller 46 is actuated through a bell crank lever which is connected to the laterally swinging free end of the wet bulb thermo-expansive motor. In the construction illustrated the controller 46 consists of an extension of a block 67 which is adjustably secured by a screw 68 upon the upper end of a link 69 having upon its lower end a yoke 70 which is pivotally connected by conical-pointed screws 71 to the horizontal arm 72 of the bell crank lever. The bell crank lever is provided at its elbow with a trunnion member 73 which is pivotally mounted upon tapered pointed screws 74 in a standard 75 extending upwardly from the plate 49. The other arm 76 of the bell crank lever extends vertically upwardly and is provided at its upper end with a yoke 77 which carries a spindle 78, the spindle 78 having at its ends conical sockets which engage at one end the pointed end of the bell crank lever arm 76 and at the other end a tapered pointed screw 79.

A block or trunnion 80 is slidably mounted upon the spindle 78 and is adjustably secured thereon by a set screw 81. The outer ends of the trunnion 80 are pivotally connected by tapered pointed screws 82 to the arms of a yoke 83 upon the end of a link 84, the opposite end of which is connected to a yoke 85 which is pivotally mounted by tapered screws 86 upon an adjustable block or trunnion 87 which is adjustably secured by a set screw 88 to a spindle 89 which is pivotally mounted at its ends on tapered screws 90 which are seated in brackets or ears 91 projecting from a plate 92 which is carried by the free ends of the thermo-expansive motors 9.

The plate 92 is connected by screws 93 to yoke-shaped members 94, the ends of which are provided with tapered screws 95 engaging the ends of spindles 96 which are secured by screws 97 to the free ends of the wet bulb thermo-expansive motors 8.

In the operation of the device the lateral bending movement of the wet bulb thermo-expansive motor carries the plate 92, which connects the ends of said thermo-expansive motors, laterally thereby transmitting motion from the spindle 89 through the link 84 to the spindle 78 which in effect forms an extension of the bell crank arm 76. This rocks the bell crank lever about its pivot, moving the arm 72 vertically and imparts a vertical movement to the controller 46. As the controller 46 engages the under face 45 of the extension 44 of the pointer 43× a swinging movement is imparted to the pointer 43× by the movement of the wet bulb thermo-expansive motor due to its action under varying conditions of temperature and moisture.

It will be remembered that the pointer is carried upon the controller 42 to which a horizontal movement is imparted by the dry bulb thermo-expansive motor. Consequently, a movement is imparted to the pointer under varying temperature conditions which is resultant from the conjoint actions of the wet and dry bulb thermo-expansive motors. If desirable, the standard 66 may be provided with a suitable scale 98 graduated to indicate wet bulb temperatures and a similar scale 99, arranged at right angles thereto, may be provided to indicate the dry bulb temperatures by means of an index secured to the plate 99 directly beneath the controller 42 to indicate the exact lateral movements of the controller. Thus the movements of the controller may be exactly indicated in degrees corresponding to the wet and dry bulb temperatures of the atmosphere and suitable adjustment may be made so that the points of intersections of the lines in which the controllers 42 and 46 move will occur exactly or approximately four degrees above the zero point of the axes of ordinates and abscissæ of wet bulb temperatures.

By reason of the adjustability of the trunnions, which connect the link 84 to the spindles 78 and 89, the effective length of the bell crank arm 76 may be varied in order to transmit to the controller 46 the required amplitude of movement to cause the same properly to co-operate with the movement of the controller 42 in actuating the pointer 43.

Means may also be provided for recording the wet bulb temperatures. Such a means may comprise a standard 100 rising from the base and carrying a suitable rotatable disk 101 driven by clock-work and provided with a suitably graduated scale. A suitable pointer 102 may be provided to co-operate with the scale 101 and said pointer may have at its indexing end a pen 103 adapted to record continuously the wet bulb temperature upon the scale. The pointer 102 may be pivotally mounted upon a stud 104 carried by an arm or bracket 105 offset from the standard 100. The lower end of the arm 102 may be provided with a slot 106 to receive the offset end 107 of an arm 108 which is pivotally connected by a set screw 109 to the plate 92.

Thus an instrument may be conveniently produced which will record the wet bulb temperature, the dry bulb temperature, and the condition of humidity dependent upon the relation of the wet bulb temperature to the dry bulb temperature.

While the instrument illustrated in Figures 1, 2, 3 and 4 is arranged to register relative humidity and to control the relative humidity of an enclosure, means may be conveniently provided for causing the instrument to indicate other functions and to control the humidity in correlation thereto.

As illustrated in Fig. 6 this is accomplished by providing the controller 42 with a transformer similar to the transformer 43, but having a suitably curved edge 110 to engage the controller 46. The curve 110 may be so plotted as to move in accordance with a desired law and to move the transformer 43 or a connector 111 corresponding to the connector 63 over the surface of the terminal members 54 and 55 which control the supply of moisture or of heat to the enclosure as the case may be.

While the instrument is illustrated herein as being adapted to indicate, register, and control conditions of humidity, means may be provided for indicating and recording the temperature conditions at a place remote from the instrument. One means for accomplishing this purpose is illustrated in Fig. 5 in which the pointer 43× is provided at its end with an electrical contact 112 which rests upon and is slidable along a suitable resistance wire 113 mounted upon an arm 114 which is carried by the extension 25 of the plate 24, the resistance wire 113 being electrically insulated from the arm 114. The end of the wire 113 is connected by a suitable conductor 115 to a remote recording apparatus 116. In such construction the current flows from the battery 117 through a conductor 118 to the instrument, thence through the pointer 43× and resistance wire 113 and conductor 115, through the recording instrument 116 to the battery. As the pointer 43× is moved under varying conditions of humidity the length of the resistance wire, through which the electric current flows, is shortened or lengthened as the case may be, thereby varying the resistance in the circuit which leads to the remote recording device and actuates the recording device in accordance with the variations in humidity which effect the thermo-expansive motor.

The means for indicating and recording temperature conditions at a place remote from the instrument may be utilized either without or in combination with the mechanism upon the instrument for indicating and recording. If both indicating mechanisms upon the instrument and at a distance are desired the resistance wire may be so arranged as to be engaged by the pointer 43×.

It will be understood that the embodiment of the invention disclosed herein is illustrative and not restrictive and that various changes in construction and arrangement of parts may be made within the spirit and scope of the following claims. It will also be understood that while I have chosen bimetallic bars, technically known as "thermostatic metal" for the thermo-sensitive elements of the device other thermo-sensitive members, such as Bourdon tubes, expansible diaphragms filled with liquid or liquids under vapor pressure, or other thermo-sensitive devices well known in the art, may be employed to achieve the same results.

Having thus described my invention, what I claim as new, and desire to secure by Letters Patent, is:

1. Hygrometric apparatus comprising a pair of movable controllers, separate means for moving said controllers respectively to positions indicative of wet and dry bulb temperatures, a movable scale and a co-operating movable pointer conjointly operable by the movements of the respective controllers to indicate a condition of humidity dependent upon the relation of the wet bulb temperature to the dry bulb temperature.

2. Hygrometric apparatus comprising movable controllers, separate means for moving said controllers respectively to positions indicative of the wet and dry bulb temperatures, indicating means operable thereby comprising a movable scale member and a movable pointer member, one of which is actuated by the movement of one controller only, while the movement of the other is produced by the conjoint action of both movable controllers.

3. Hygrometric apparatus comprising a pair of controllers movable respectively in lines parallel with the axis of ordinates and the axis of abscissæ in accordance with wet and dry bulb temperatures, automatic means subject respectively to the wet and dry bulb temperatures of the atmosphere for actuating said controllers and means movable by the relative movements of each of said controllers and operable thereby to compute and indicate directly a condition of humidity dependent upon the relation of the wet bulb temperature to the dry bulb temperature.

4. Hygrometric apparatus comprising a pair of controllers movable respectively in lines parallel with the axis of ordinates and the axis of abscissæ in accordance with wet and dry bulb temperatures, automatic means subject respectively to the wet and dry bulb temperatures of the atmosphere for actuating the respective controllers, means for relatively adjusting said controllers to calibrate the instrument and means movable by the relative movements of said controllers and operable thereby to compute and indicate directly a condition of humidity dependent upon the relation of the wet bulb temperature to the dry bulb temperature.

5. Hygrometric apparatus comprising a pair of movable controllers, means for moving said controllers respectively in lines parallel with the axis of ordinates and the axis of abscissæ in accordance with wet and dry bulb temperatures, the lines of movement of said controllers being so disposed as to meet at a predetermined point above and substantially at equal distances from the zero point of the axes of said ordinates and said abscissæ, and indicating means comprising relatively movable members, one of which partakes of the movement of one of said controllers and the other of which is actuated by the conjoint movement of both of said controllers.

6. Hygrometric apparatus comprising a pair of movable controllers, means for moving said controllers automatically respectively in lines parallel with the axis of ordinates and the axis of abscissæ in accordance with wet and dry bulb temperatures, the line of movement of said controllers being so disposed as to meet at a point approximately four degrees distance from the zero point of the axes of ordinates and abscissæ and means operable by the conjoint movement of said controllers to indicate a condition of humidity dependent upon the relation of the wet bulb temperature to the dry bulb temperature.

7. Hygrometric apparatus comprising a pair of movable controllers, means for moving said controllers respectively in lines parallel with the axis of ordinates and the axis of abscissæ in accordance with wet and dry bulb temperatures, the lines of movement of said controllers being so disposed as to meet at a point approximately four degrees' distance from the zero point of the axes of ordinates and abscissæ, and indicating means comprising relatively movable members one of which is actuated by the movement of one of said controllers and the other of which is actuated by the conjoint movement of both of said controllers.

8. Hygrometric apparatus comprising a pair of movable controllers, means for moving said controllers respectively in lines parallel with the axis of ordinates and the axis of abscissæ in accordance with wet and dry bulb temperatures, the lines of movement of said controllers being so disposed as to meet at a predetermined point above and substantially at equal distances from the zero point of the axes of said ordinates and said abscissæ, and indicating means comprising relatively movable members one of which partakes of the movement of one of said controllers and the other of which is actuated by the conjoint movement of both of said controllers, and means for adjusting one of said controllers to position the effective field of movement thereof properly in relation to the field of movement of the other controller.

9. Hygrometric apparatus comprising a pair of movable controllers, means for moving said controllers respectively in lines parallel with the axis of ordinates and the axis of abscissæ in accordance with wet and dry bulb temperatures, the lines of movement of said controllers being so disposed as to meet at a predetermined point above and substantially at equal distances from the zero point of the axes of said ordinates and said abscissæ, and indicating means comprising relatively movable members one of which partakes of the movement of one of said controllers and the other of which is actuated by the conjoint movement of both of said controllers, and means for adjusting each of said controllers whereby their effective fields of movement may be coordinated to enable said indicating means to indicate or register different predetermined conditions of humidity of the atmosphere.

10. Hygrometric apparatus comprising a pair of movable controllers, means for moving one of said controllers to positions indicative of the dry bulb temperature, means for moving the other controller to positions indicative of wet bulb temperature and indicating means operable by said controllers comprising a scale movable in unison with said dry bulb temperature indicating controller and a pointer operable by the conjoint action of both of said movable controllers.

11. Hygrometric apparatus comprising a thermo-expansive motor responsive to the wet bulb temperature of the air, a second thermo-expansive motor responsive to the dry bulb temperature of the air, indicating mechanism including a movable scale member and a movable pointer member, means for transmitting motion to one of said members from the movement of one of said thermo-expansive motors and means for actuating the other member by the conjoint movement of both of said thermo-expansive motors.

12. Humidity indicating apparatus comprising two thermo-expansive motors responsive respectively to wet bulb and dry bulb temperatures having effective movements in angularly different directions, an indicating mechanism including a movable scale member and a movable pointer member, means for actuating one of said members from one of said thermo-expansive motors and means for actuating the other member through the conjoint action of both of said thermo-expansive motors.

13. Humidity indicating apparatus comprising two thermo-expansive motors responsive respectively to wet bulb and dry bulb temperatures having effective movements in angularly different directions, a scale carried by one thermo-expansive motor and a co-operating index movable in unison with one of said thermo-expansive motors and operable by the conjoint movement of both said thermo-expansive motors to indicate the humidity conditions upon said scale which are dependent upon the relation of the wet and dry bulb temperatures.

14. Humidity indicating apparatus comprising two thermo-expansive motors responsive respectively to wet bulb and dry bulb temperatures and having effective movements in angularly different directions, a scale carried by the dry bulb thermo-expansive motor, a pointer member pivotally mounted on said dry bulb thermo-expansive motor and means operable by the wet bulb thermo-expansive motor engaging said pointer member whereby said pointer is actuated by the conjoint movement of both of said thermo-expansive motors.

15. Hygrometric apparatus comprising a pair of bi-metallic thermo-expansive-bar motors rigidly supported at one end and freely movable laterally at the opposite end, subject respectively to the wet and dry bulb temperatures of the atmosphere and so arranged that when subject to similar variations in temperature to bend in different directions and means operable by the relative movements of the free ends of said motors to compute and indicate directly a condition of humidity which is dependent upon the relation of said wet and dry bulb temperatures.

16. Hygrometric apparatus comprising a pair of normally parallel bi-metallic thermo-expansive-bar motors, rigidly mounted at one end and freely movable laterally at the other end, subject respectively to wet and dry bulb temperatures of the atmosphere, co-operating controllers relatively movable in different angular directions by said motors when the latter are subjected to variations in temperature and means operable by the conjoint action of said controllers to indicate conditions of humidity dependent upon the relation of the wet bulb temperature to the dry bulb temperature.

17. Hygrometric apparatus comprising a pair of normally parallel bi-metallic thermo-expansive-bar motors, rigidly mounted at one end and freely movable laterally at the other end, subject respectively to wet and dry bulb temperatures of the atmosphere, co-operating controllers relatively movable in different angular directions by said motors when the latter are subjected to variations in temperature and means operable by the conjoint action of said controllers for recording directly conditions of humidity dependent upon the relation of said wet and dry bulb temperatures.

18. Hygrometric apparatus comprising a pair of normally parallel bi-metallic thermo-expansive-bar motors, rigidly mounted at one end and freely movable laterally at the other end, subject respectively to wet and dry bulb temperatures of the atmosphere, co-operating controllers relatively movable in different angular directions by said motors when the latter are subjected to variations in temperature and regulator controlling means operable by the conjoint action of said controllers.

19. Hygrometric apparatus comprising a pair of bi-metallic thermo-expansive-bar motors, rigidly mounted at one end and freely movable laterally at the other end, subject respectively to wet and dry bulb temperatures of the atmosphere, a controller supported upon one of said motors and movable therewith, a co-operating controller movable in a different angular direction by the movement of the other motor and means operable by the conjoint movement of said controllers to indicate a condition of humidity of the atmosphere.

20. Hygrometric apparatus comprising a pair of normally parallel bi-metallic thermo-expansive-bar motors, rigidly supported at one end and freely movable laterally at the opposite end, subject respectively to wet and dry bulb temperatures of the atmosphere, and so arranged that when subject to similar variations in temperature said bars of the respective motors will bend in opposite directions, indicating means partaking of the movement of one of said motors and means operable by the other bar acting upon said indicating means in angular relation to the movement thereof to cause said indicating means to compute and indicate directly a condition of humidity dependent upon the relation of said wet and dry bulb temperatures.

21. Hygrometric apparatus comprising a pair of normally parallel bi-metallic thermo-expansive-bar motors, rigidly mounted at one end and freely movable laterally at the other end, subject respectively to the wet and dry bulb temperatures of the atmosphere, a controller carried by the dry bulb motor partaking the movement thereof, a second controller movable in angular relation thereto and means for actuating the latter from the wet bulb motor including a bell crank lever connected to said wet bulb motor and to said controller and means operable by the conjoint movement of said controllers to indicate a condition of humidity dependent upon the relation of the wet bulb temperature to the dry bulb temperature.

22. Hygrometric apparatus comprising a pair of normally parallel bi-metallic thermo-expansive-bar motors, rigidly mounted at one end and freely movable laterally at the other end, subject respectively to the wet and dry bulb temperatures of the atmosphere, a controller carried by the dry bulb motor partaking the movement thereof, a second controller movable in angular relation thereto and means for actuating the latter from the wet bulb motor including a bell crank lever connected to said wet bulb motor and to said controller, means for adjusting the effective length of one of the arms of said bell crank lever and means operable by the conjoint movement of said controllers to indicate a condition dependent upon the relation of the wet bulb temperature to the dry bulb temperature.

23. Hygrometric apparatus comprising a pair of normally parallel bi-metallic thermo-expansive-bar motors, rigidly mounted at one end and freely movable laterally at the other end, subject respectively to the wet and dry bulb temperatures of the atmosphere, a controller carried by the dry bulb motor partaking of the movement thereof, means for adjusting the position of said controller in the direction of movement thereof, a second controller movable in angular relation thereto, means connecting said second controller to said wet bulb motor and means operable by the conjoint movement of said controllers to indicate a condition of humidity dependent upon the relation of the wet bulb temperature to the dry bulb temperature.

24. Hygrometric apparatus comprising a pair of normally parallel bi-metallic thermo-expansive-bar motors, rigidly mounted at one end and freely movable laterally at the other end, subject respectively to the wet and dry bulb temperatures of the atmosphere, a controller carried by the dry bulb motor partaking of the movement thereof, means for adjusting the position of said controller in a direction transversely of the direction of movement thereof, a second controller movable in angular relation thereto, means connecting said second controller to said wet bulb motor and means operable by the conjoint movement of said controllers to indicate a condition of humidity dependent upon the relation of the wet bulb temperature to the dry bulb temperature.

25. Hygrometric apparatus comprising a pair of controllers movable respectively in lines parallel with the axis of ordinates and the axis of abscissæ representing wet and dry bulb temperatures, automatic means subject respectively to the wet and dry bulb temperatures of the atmosphere for actuating said controllers and regulator controlling means operable by the relative movements of said controllers.

26. Hygrometric apparatus comprising a thermo-expansive motor responsive to the wet bulb temperature of the air, a second thermo-expansive motor responsive to the dry bulb temperature of the air, recording mechanism including a travelling scale and a co-operating movable pointer carried by one of said thermo-expansive motors and means operable by the other thermo-expansive motor acting upon said pointer to cause the same to compute and record directly a temperature condition of the atmosphere dependent upon the relation of the wet bulb member to the dry bulb member.

27. Hygrometric apparatus comprising a thermo-expansive motor responsive to the wet bulb temperature of the air, a second thermo-expansive motor responsive to the dry bulb temperature of the air, a controller carried by said dry bulb thermo-expansive motor and partaking the movement thereof, a controller movable by said wet bulb thermo-expansive motor in angular relation to the movement of said wet bulb thermo-expansive motor, a regulator controlling device comprising co-operating members carried respectively by said dry bulb thermo-expansive motor and said wet bulb thermo-expansive motor and operable by the conjoint movement of said controllers.

28. Hygrometric apparatus comprising movable controllers, means for moving said controllers independently to positions indicative respectively of the wet and dry bulb temperatures, a transformer pivotally mounted upon one of said controllers having a variable engagement with the other controller and movable by the conjoint movement of said controllers to positions indicative of the condition of the air which is dependent upon the relation of the wet bulb temperature to the dry bulb temperature and regulator controlling means operable by said transformer.

In testimony whereof, I have signed my name to this specification.

EDWARD W. COMFORT.